United States Patent
Miyazawa et al.

(10) Patent No.: US 6,530,444 B2
(45) Date of Patent: Mar. 11, 2003

(54) CONTROLLED LEVITATION VEHICLE

(75) Inventors: Kazuhiro Miyazawa, Narutou-machi (JP); Koji Kiyomoto, Tomisat-machi (JP)

(73) Assignee: Otis Elevator Company, Farmington, CT (US)

(*) Notice: Subject to any disclaimer, the term of this patent is extended or adjusted under 35 U.S.C. 154(b) by 0 days.

(21) Appl. No.: 09/829,462

(22) Filed: Apr. 9, 2001

(65) Prior Publication Data
US 2001/0045311 A1 Nov. 29, 2001

(30) Foreign Application Priority Data
Apr. 18, 2000 (JP) .......................................... 2000-116139

(51) Int. Cl.$^7$ ................................................. B60V 3/04
(52) U.S. Cl. ........................ 180/116; 180/121; 180/122; 104/23.2
(58) Field of Search ................................ 180/116, 117, 180/119, 120, 121, 122, 123, 125, 128, 129; 104/23.1, 23.2

(56) References Cited

U.S. PATENT DOCUMENTS

| | | | | |
|---|---|---|---|---|
| 3,648,799 A | * | 3/1972 | Young et al. | 180/121 X |
| 3,653,458 A | * | 4/1972 | Donlon | 180/116 X |
| 3,768,588 A | * | 10/1973 | Vaughen | 180/124 |
| 3,791,477 A | * | 2/1974 | Burdick | 180/117 |
| 4,529,054 A | * | 7/1985 | Tattersall | 180/120 |
| 4,607,715 A | * | 8/1986 | Michels et al. | 180/125 X |
| 5,655,616 A | * | 8/1997 | Witt et al. | 180/117 |
| 6,202,782 B1 | * | 3/2001 | Hatanaka | 180/301 |

FOREIGN PATENT DOCUMENTS

GB      2160487 A    * 12/1985

* cited by examiner

*Primary Examiner*—F. Zeender

(57) ABSTRACT

In a controlled levitation vehicle that has a levitation apparatus where multiple air pads are connected to the undersurface of a chassis that also doubles as a duct connected to a blower, and where damper valves are connected between the blower and chassis and to the chassis, it is furnished with: a controller (S1, S2) that closes the damper valve between the blower and chassis when starting and that also regulates the frequency of the inverter to the standby frequency that is below the levitation frequency; the controller (S6, S7) also closing the chassis damper valve responsive to an instruction to levitate and also increasing the frequency from a standby frequency to a levitation frequency to cause the vehicle to levitate; and the controller also lowering (S9–S12) the frequency from the levitation frequency to the standby frequency upon an instruction to land and also opening the blower and chassis damper valves to stop the vehicle rapidly.

6 Claims, 5 Drawing Sheets

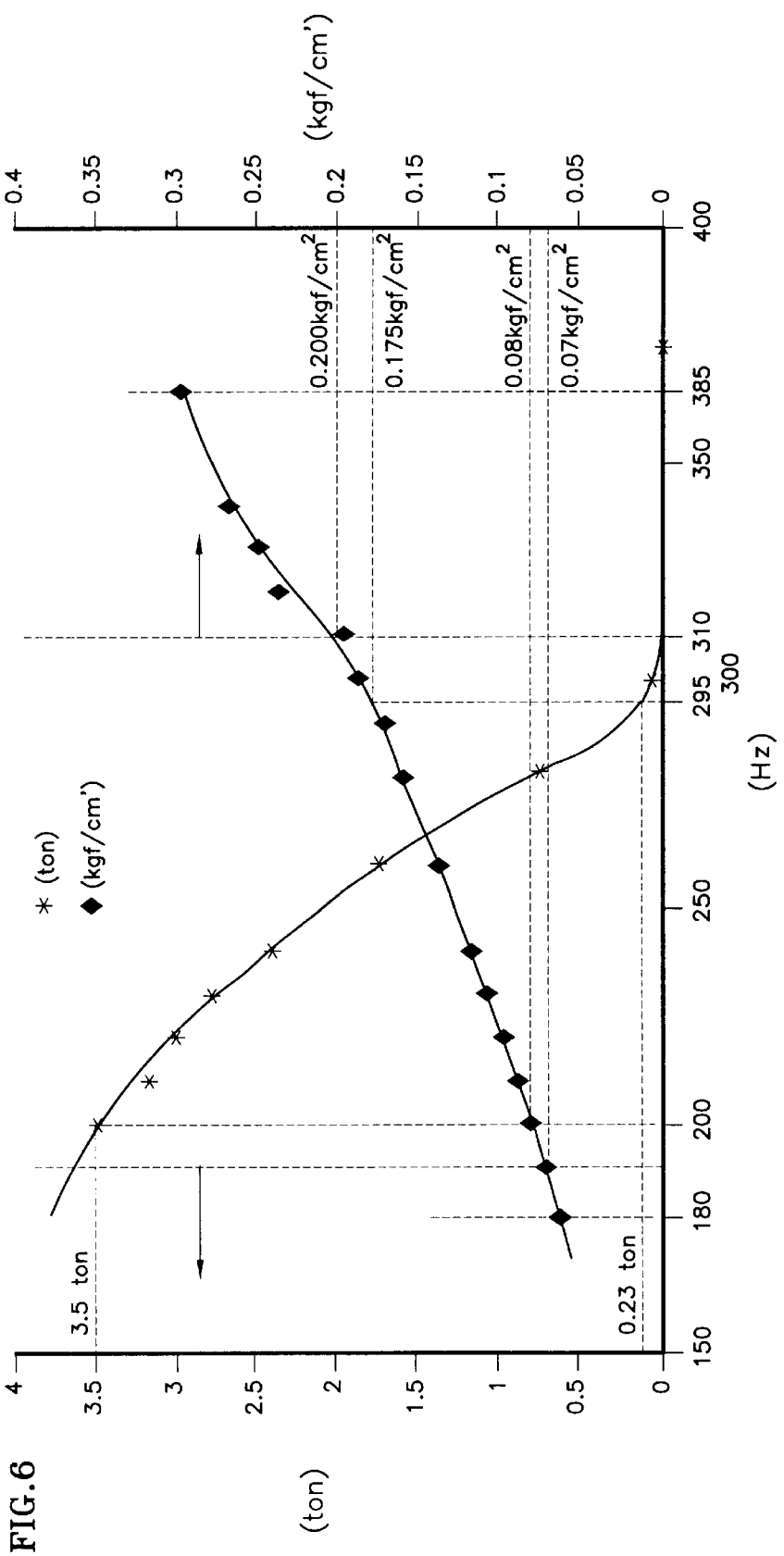
FIG.6
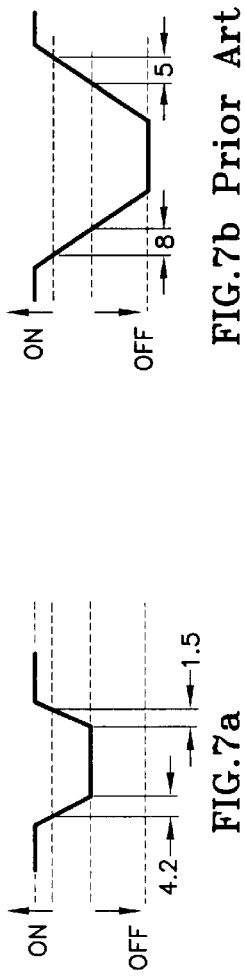
FIG.7b Prior Art
FIG.7a

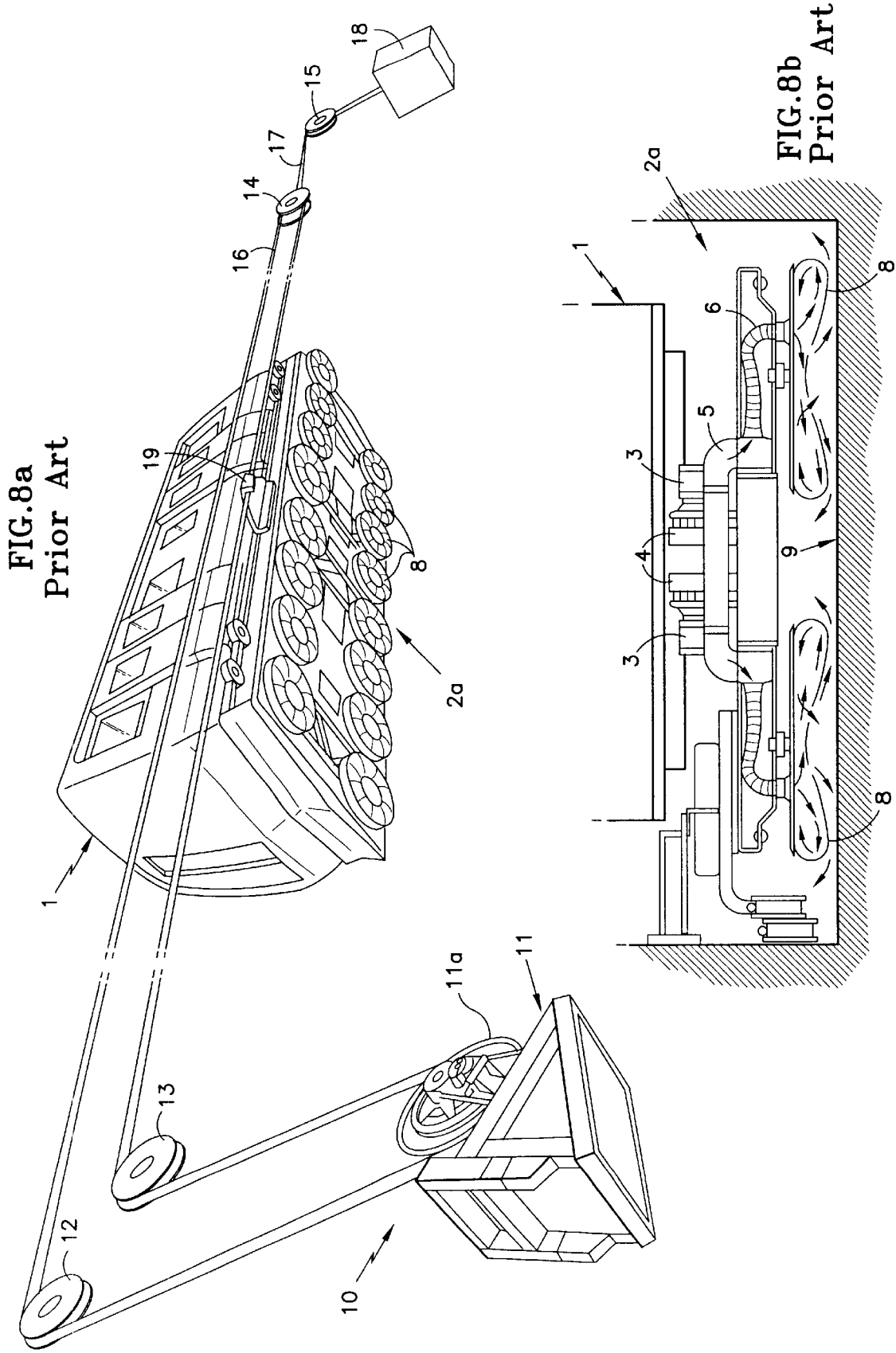

CONTROLLED LEVITATION VEHICLE

TECHNICAL FIELD

This invention pertains to a controlled levitation vehicle that is designed so that the vehicle levitation and stop times can be shortened.

BACKGROUND ART

Vehicles that are levitated on air include rope shuttles where the vehicle is towed by a rope, and linear shuttles where the vehicle is driven by a linear motor.

A rope shuttle, as shown in FIGS. 8a and 8b, is furnished with levitation apparatus 2a on the bottom part of shuttle vehicle 1. Levitation apparatus 2a comprises blower 4 that is driven by a motor 3, many air pads 8, duct 5 and a hose 6 that connect the air pads 8 and a blower 4. It is constituted so that vehicle 1 is made to levitate above track or roadway 9 by supplying air from blower 4 to air pads 8.

Tow device 10 that moves vehicle 1 is furnished with winch 11 and pulleys 12 and 13 in one tow section and is equipped with pulleys 14 and 15 and a weight 18 in the other. Wire rope 16 runs endlessly on cable wheel 11a, pulleys 12, 14, and 13, and cable wheel 11a of winch 11 in that order. The other end of wire rope 17 that is connected to pulley 14 is connected to weight (or hydraulic system) 18 via pulley 15. Tension is applied to pulley 14 in the direction of pulley 15 by the force of weight 18, and rope 16 is attached to wire rope attachment arm 19 furnished for wire rope 16 and vehicle 1.

When vehicle 1 is moved, the vehicle is made to levitate above track 9 by levitation apparatus 2a. Winch 11 is driven while vehicle 1 is levitated, vehicle 1 is towed by rope 16, and vehicle 1 is moved without any frictional resistance between vehicle 1 and track 9.

A linear shuttle levitation apparatus, as shown in FIG. 2, comprises air pads 8 attached to chassis 7 of vehicle 1. Chassis 7 is used as an air distribution duct to air pads 8 so that air is supplied to air pads 8 via duct 5 and chassis 7 from blower 4.

The linear induction motor of a linear shuttle, as shown in FIGS. 1a and 1b, is constituted with the primary side (primary core and primary coil) 21 of the linear induction motor being furnished on the bottom part of vehicle 1 and secondary side (conductor) 22 being placed on track 9.

When the vehicle is moved, vehicle 1 is made to levitate by levitation apparatus 2. While vehicle 1 is levitated, a three-phase power source is connected to the linear motor, a moving magnetic field is generated on primary side 21, and vehicle 1 is moved by means of the electromagnetic force resulting when a secondary current is generated by this magnetic field on the secondary side, producing thrust. When vehicle 1 is moved in two directions, the phase sequence of the three-phase power source input to the linear induction motor can be reversed.

With a rope shuttle, the vehicle is coupled to a rope, so by operating a brake attached to the winch the vehicle can be held in place and stopped at a station while the vehicle remains levitated. However, in the case of a linear shuttle, the linear motor that drives the vehicle is self-propelled and mounted to the vehicle, so the vehicle cannot be held still while it remains levitated. This can be solved by furnishing a separate brake apparatus, but as the number of components increases, the rate of breakdowns also rises.

As shown in FIG. 3, the shuttle brake comprises brake skid 23, furnished on the bottom of the vehicle that touches the surface of track 9 when levitation ceases, thereby stopping vehicle 1 by the friction between brake skid 23 and track 9. In this arrangement, the vehicle drops and the brake skid engages due to the cutting off of the air sent to the air pads of the levitation apparatus.

In the past, motor 3 of blower 4 would have been turned on and off to shut off air to air pads 8, so the blower rotation when stopped at the station would be zero. Time would therefore be required to restart the blower, and as a result, passengers would have to wait, and the number of operation cycles (headway frequency) could not be increased.

This invention was devised with the aforementioned problems of linear shuttles in mind. Its purpose is to provide a controlled levitation vehicle that will permit the vehicle to re-levitate rapidly after the vehicle has stopped levitation and has been held on the track by the brake skid.

DISCLOSURE OF INVENTION

According to the present invention, a levitation vehicle is equipped with a levitation apparatus that has a blower driven by a motor, multiple air pads are furnished for a chassis that also serves as a duct connected to the blower, and damper valves are furnished for the discharge side of the blower and for the chassis, and a brake skid is attached to the under-surface of the chassis. The vehicle is further equipped with an inverter that operates the blower motor, a means that makes the blower discharge damper valve close when starting and that also regulates the output of the inverter to the standby output, a means that makes the chassis damper valve close when there is an instruction to levitate and that also regulates the output of the inverter to the levitation output, and a means that returns the output of the inverter to the standby state when there is an instruction to land and that also makes the blower discharge damper valve open. Time required for the vehicle to levitate and to stop will be shortened.

BRIEF DESCRIPTION OF THE DRAWINGS

FIG. 6 is a graph that shows the relationships of the linear shuttle blower inverter frequency, air pressure, and the static friction load of the brake.

FIG. 7 is a graph that explains levitation and landing time, with the control of this invention and without control of the damper valves.

FIGS. 8a and 8b are schematic diagrams explaining the levitation apparatus of a conventional rope shuttle.

MODE(S) FOR CARRYING OUT OF THE INVENTION

Figure 1A:
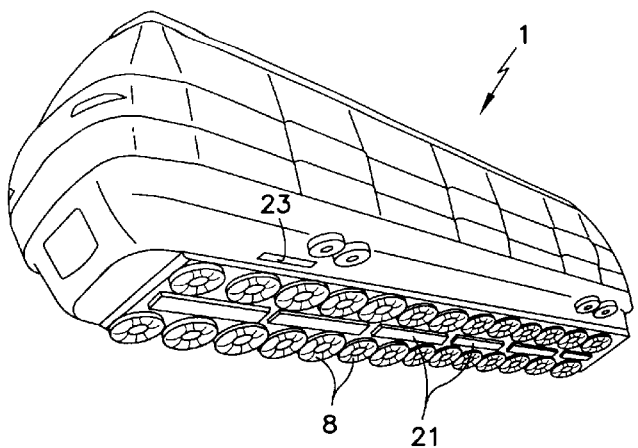
FIGS. 1a and 1b are diagrams explaining the linear motor of a linear shuttle.
Figure 1B:
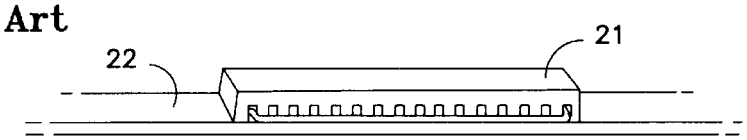

Referring to the drawing figures, FIG. 1 shows the constitution of the linear induction motor of a linear shuttle. Primary side 21 of the linear induction motor is installed in the direction of the vehicle axis on the bottom part of vehicle 1. Secondary side 22 is installed along the track. When a three-phase power source is connected to primary side 21, vehicle 1 travels according to the principle of the induction motor.

Figure 2:
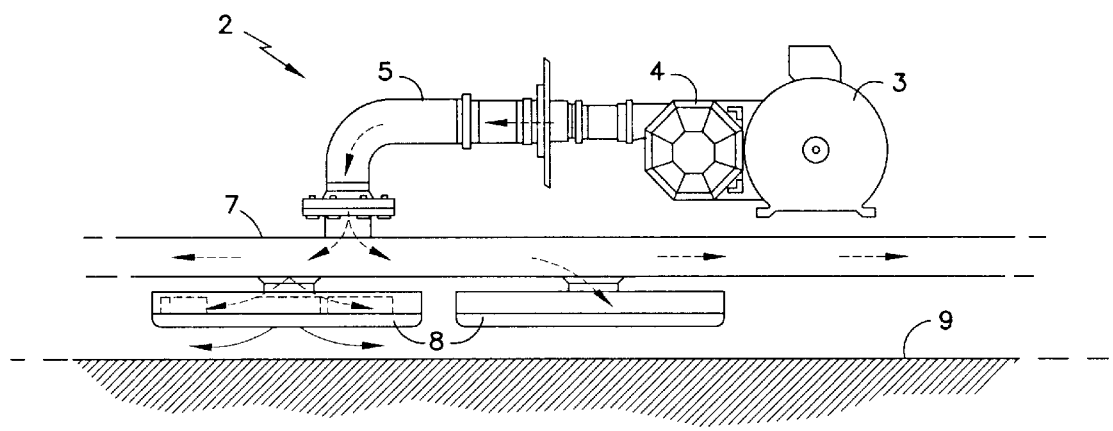
FIG. 2 is a schematic diagram explaining the linear shuttle levitation apparatus.

FIG. 2 shows the linear shuttle levitation apparatus. Levitation apparatus 2 has motor 3, and blower 4 that is driven by motor 3, installed on top of chassis 7 that also serves as the duct of vehicle 1. The discharge side of blower 4 is connected to chassis 7 via duct 5, and multiple air pads 8 are connected to the underside of chassis 7. When motor 3 is operated, pressurized air discharged from blower 4 is blown through duct 5 and chassis 7 onto the surface of track 9 from air pads 8 and vehicle 1 levitates.

Figure 3:
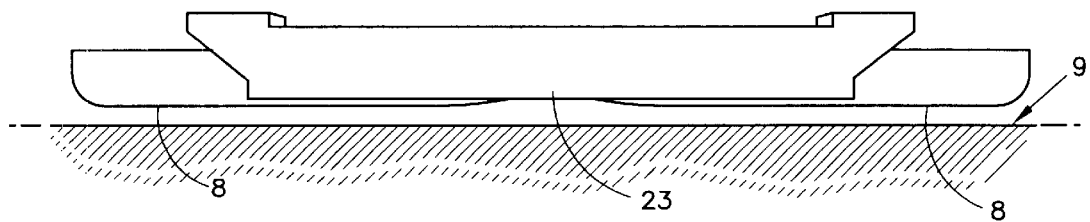
FIG. 3 is a schematic diagram explaining a linear shuttle brake skid.

FIG. 3 shows the brake skid of the linear shuttle. Brake skid 23 is attached at left and right on the undersurface of chassis 7 of vehicle 1. When vehicle 1 stops levitation, the vehicle descends, and skid 23 touches the surface of track 9, movement of vehicle 1 is stopped by friction.

Figure 4:
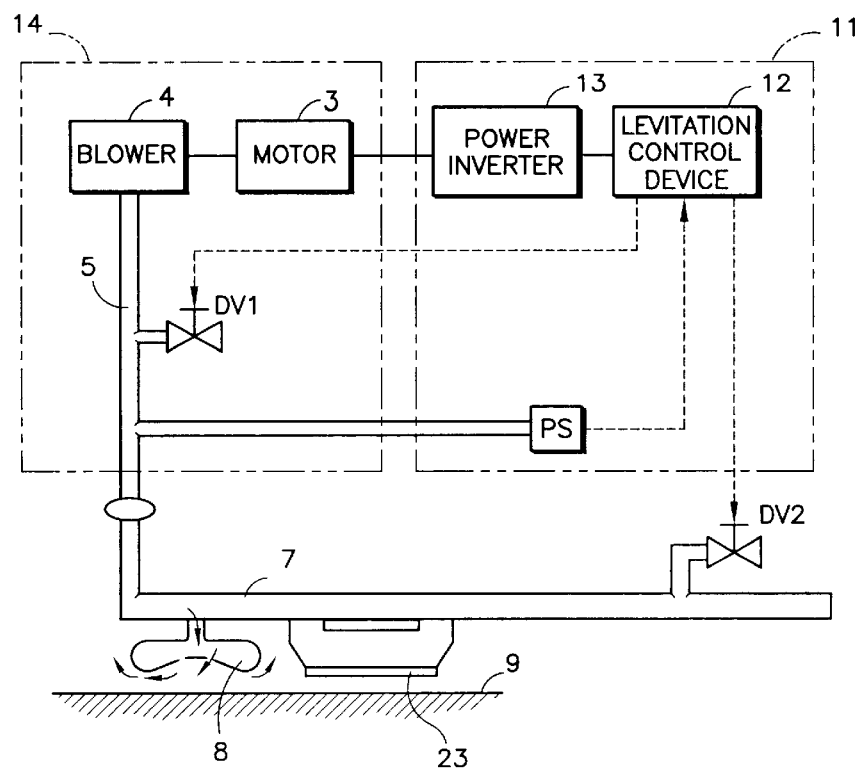
FIG. 4 is a system block diagram for levitation apparatus.

FIG. 4 shows the control system constitution of levitation apparatus 2 according to the present invention. Element 11 is an inverter box for levitation, and it is constituted with power inverter 13 that operates motor 3 of blower 4, pressure sensor (PS) that outputs the air pressure in duct 5, and levitation control device 12 that controls this inverter 13 and the like. Element 14 is a blower box; it is furnished with motor 3, blower 4, duct 5, and damper valve (DV1) that adjusts the air pressure of duct 5. Damper valve (DV2) for adjusting the air pressure in the chassis is also furnished for chassis 7 to which air pads 8 are connected.

Inverter 13 and damper valves (DV1) and (DV2) are controlled based on pressure signals etc., from pressure sensor (PS) to the levitation control device. The levitation control flowchart for this levitation control device 12 is shown in FIG. 5.

Figure 5:
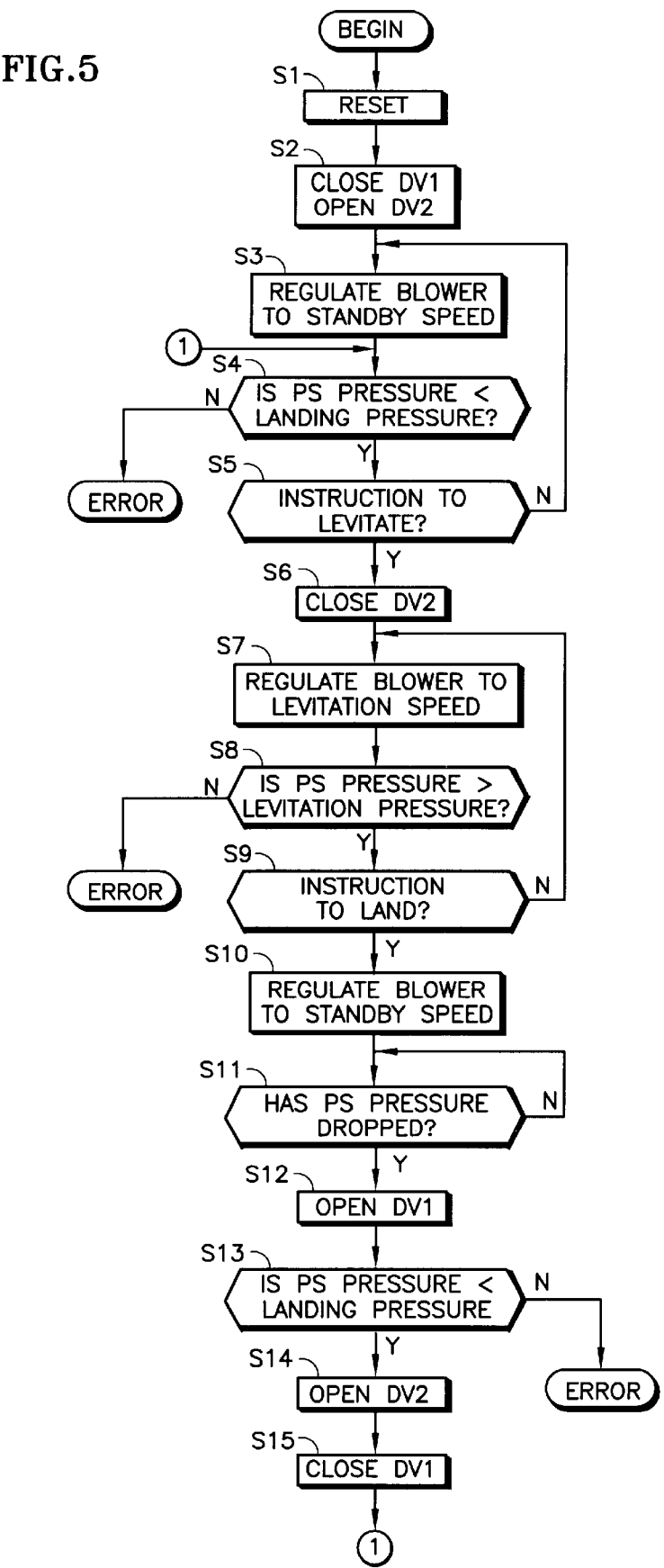
FIG. 5 is a levitation control flowchart.

In FIG. 5, first, a reset operation (S1) is performed upon starting. Damper valve (DV1) in the blower box is closed (S2) and damper valve (DV2) on the chassis is opened, and if the output of inverter (13) is regulated (S3) to the blower standby speed that does not result in levitation and maintains the blower air pressure at a vehicle levitation standby state (S1–S3). Then, whether the pressure is less than landing pressure is judged based on signals from pressure sensor (PS) (S4). If no, operation of the system is terminated due to error, and if yes, arrival of an instruction to levitate is monitored by the system (S5). When an instruction to levitate comes, the judgement result of S5 will be yes, damper valve (DV2) on the chassis is closed (S6), and the output of inverter 13 is raised to the blower levitation speed (S7). As a result, air pressure in the blower rises and the vehicle, which has been in a levitation standby state, immediately levitates. When the vehicle levitates, a separate linear motor is controlled and the vehicle may be moved.

After control to the levitation speed at S7, whether the pressure is greater than the levitation pressure is judged based on signals from pressure sensor (PS) (S8). If no, operation is terminated; if yes, arrival of an instruction to land is monitored (S9). When an instruction to land comes and the judgment result of S9 becomes yes, the output of inverter 13 is lowered to the blower standby speed (S10), the fact that the levitation pressure has dropped is detected, blower box damper valve (DV1) is opened, and the vehicle lands rapidly (S11, S12).

Next, it is judged whether the pressure is less than the landing pressure (S13) based on signals from pressure sensor (PS). If no, system operation is terminated. If yes, chassis damper valve (DV2) is opened (S14) and blower box damper valve (DV1) is closed (S15). The system then returns to S4 as shown.

The aforementioned blower standby speed is the safe and correct value where the vehicle will assuredly not move; the force of friction between the brake skid and the track surface having already been measured for all levels of blower operation.

The definition and calculation of levitation and landing will be explained below. Levitation and landing of the shuttle vehicle are detected by pressure sensor (PS) at the discharge side of the blower. The set value and the measured value of the comparison output of pressure sensor (PS) are measured and calculated, and levitation completion and landing completion signals are determined.

First, the relationship between the frequency of inverter 13 and the static friction load of brake skid 23 against track 9 is measured. As an example, motor 3 of blower 4 is driven by inverter 13, so that when its frequency is changed from 365 Hz to 200 Hz, the force causing vehicle 1 to start to move is measured for that case. At the same time, the relationship between the frequency and the blower discharge pressure is determined, and the definitions of levitation and landing below were fit to these two characteristics and the discharge pressures at levitation completion and landing completion were found.

TABLE 1

| Example |
| --- |
| Total Vehicle Weight + 105 persons × 70 kg/person = 22.7 ton |
| Static friction coefficient of airpad = 0.01 |
| Max slope when parked = 10% |
| Max wind load of 40 m/sec = 1.196 ton |

Thus, levitation is defined as the condition at which the vehicle just begins to move when levitated, $$\text{Levitation Force} = 22.7 \text{ ton} \times 0.01 = 0.227 \text{ ton}$$

and landing is defined as the condition at which the vehicle will not move under normally expected forces, i.e., stopped on 10% slope with 40 m/sec wind load in direction of slopes, $$\text{Landing force} = 22.7 \text{ ton} \times \sin(\tan^{-1}(10/100)) + 1.196 \text{ ton} = 3.466 \text{ ton}$$

Thus, levitation is the point where a force of 0.227 ton starts the vehicle moving, and landing is the point where it does not move even when 3.466 ton is applied.

Blower speed at landing must be 190 Hz (discharge pressure 0.07 kgf/cm$^2$) and at levitation must be 310 Hz (discharge pressure 0.200 kgf/cm$^2$) from the relationship of the levitation inverter frequency, the static friction load and the discharge pressure. In this case, pressure is sensed, and judgment is made whether levitation is completed or landing is completed.

The relationship of frequency, pressure, and static load of the aforementioned linear shuttle is shown in FIG. 6.

In this application example, when starting, the blower has already been started at a standby speed at which the vehicle will not levitate, as shown in FIG. 5. For this reason, when an instruction to levitate comes and the inverter output increases to the blower levitation speed, blower discharge pressure rises from the standby state. The vehicle therefore levitates rapidly and will be able to travel. When a stop instruction comes and the inverter output switches to the blower standby speed, the damper valve (DV1) is in this case forcibly opened and internal air is exhausted, so that landing time is shortened. In the case of on/off control in the past, 8 seconds would have been required for landing and 5 seconds for levitation as shown in FIG. 7(b), but with this invention, the blower remains operating at standby speed, and may be quickly ramped up to levitation speed as shown in FIG. 7(a). Therefore, both landing and levitation time can be greatly shortened. Note that in an emergency, damper valves (DV1) and (DV2) open in response to an emergency stop signal to bring the vehicle to an emergency stop, so it is not necessary to furnish any additional damper valves for control of levitation.

Levitation completion signals and landing completion signals are generated by operation of relays in each inverter box by the output of a pressure sensor in each inverter box. Three blowers are mounted on the shuttle, and levitation is normally accomplished with two of them. Thus, a logic circuit (not shown) is constructed on the terminal block of the blower controller so that even when two of the three are selected, the pressure of the two will reach a level that permits travel and a levitation completion signal will be output.

For the landing completion signal, the landing signals in each inverter box are serially connected so that, even if one exceeds landing pressure, no signal is output to the vehicle controller, so that they cannot be output until all the pressure sensors, including during standby status, detect landing completion. The relay contact is constituted with relay contact, and in the landed state, a landing completion signal is output to the vehicle controller. This also constitutes a logic circuit on the terminal block of the blower controller.

This invention is constituted as described above, so it demonstrates the effects described below.

(1) Levitation is controlled by raising the output of the blower motor drive inverter and blower from the standby speed to the levitation speed, so levitation time is shortened.

(2) For landing, inverter output is lowered from the levitation frequency to the standby speed, and at the same time, the damper valves are opened and the air inside is exhausted, so that landing time is shortened.

(3) For each blower speed, the force of landing brake friction is incorporated into the control in the form of pressure, and feedback is applied, so that landing brake friction force can be correctly and rapidly obtained.

(4) To levitate after a landing, the damper valves are closed and blower speed is raised from the standby speed to the levitation speed, so that levitation can occur rapidly.

What is claimed is:

1. A controlled levitation vehicle having a levitating apparatus comprising a blower driven by a motor, multiple air pads, a duct connecting the blower and the air pads, a brake skid attached to the vehicle for contact with a track, characterized in that said vehicle further includes means for driving the blower motor, a first damper valve disposed in the duct for venting air therefrom, means for closing the first damper valve upon an instruction to levitate the vehicle, and opening the first damper valve upon an instruction to land the vehicle means for regulating the driving means to drive the blower motor at a levitation speed in response to an instruction to levitate the vehicle and at a non-zero standby speed in response to an instruction to land the vehicle, said standby speed selected so as to maintain sufficient contact between said brake skid and the track to prevent horizontal movement of the vehicle.

2. The vehicle as recited in claim 1, wherein the driving means is an inverter.

3. A controlled levitation vehicle having a levitating apparatus comprising a blower driven by a motor, multiple air pads, a duct connecting the blower and the air pads, a brake skid attached to the vehicle, characterized in that said vehicle further includes means for driving the blower motor, a first damper valve disposed in the duct for venting air therefrom, means for closing the first damper valve upon an instruction to levitate the vehicle, and opening the first damper valve upon an instruction to land the vehicle means for regulating the driving means to drive the blower motor at a levitation speed in response to an instruction to levitate the vehicle and at a standby speed in response to an instruction to land the vehicle; and a second damper valve disposed in the duct for venting air therefrom and controlled in response to the levitation and landing instructions, and wherein the first damper valve is located adjacent to the blower and the second damper valve is located adjacent to the air pads.

4. A method for controlling the levitation of a levitation vehicle above a track having a blower, multiple air pads, a duct therebetween, a landing skid, and a damper valve disposed in the duct for venting air therefrom;

comprising the steps of:
 a) closing the damper valve and regulating the speed of the blower to a levitation speed sufficient to levitate the vehicle in response to an instruction to levitate the vehicle and
 b) opening the damper valve and regulating the speed of the blower to a non-zero standby speed insufficient to levitate the vehicle in response to an instruction to land the vehicle, and
 c) selecting said standby speed so as to maintain sufficient contact between the landing skid and the track to prevent horizontal movement of the vehicle.

5. A method of controlling a levitation vehicle having a levitation apparatus comprising a blower driven by a motor, multiple air pads, a duct connecting the blower and the air pads, a brake skid attached to the vehicle for contact with a track, means for driving the blower motor, and a damper valve disposed in the duct for venting air therefrom, said method comprising:

closing the damper valve upon an instruction to levitate the vehicle, and opening the damper valve upon an instruction to land the vehicle;

regulating the driving means to drive the blower motor at a levitation speed in response to an instruction to levitate the vehicle and at a non-zero standby speed in response to an instruction to land the vehicle; and selecting said standby speed so as to maintain sufficient contact between the brake skid and the track to prevent horizontal movement of the vehicle.

6. A controlled levitation vehicle above a track having a blower, multiple air pads, a duct therebetween, and a landing skid, characterized in that said vehicle further includes a damper valve disposed in the duct for venting air therefrom; and means for closing the damper valve and regulating the speed of the blower to a levitation speed sufficient to levitate the vehicle in response to an instruction to levitate the vehicle, and for opening the damper valve and regulating the speed of the blower to a non-zero standby speed, insufficient to levitate the vehicle in response to an instruction to land the vehicle, said standby speed being selected so as to maintain sufficient contact between the landing skid and the track to prevent horizontal movement of the vehicle.

* * * * *